Feb. 8, 1966  A. R. GOLDSBY  3,234,301
SULFURIC ACID RECOVERY PROCESS
Filed July 28, 1964
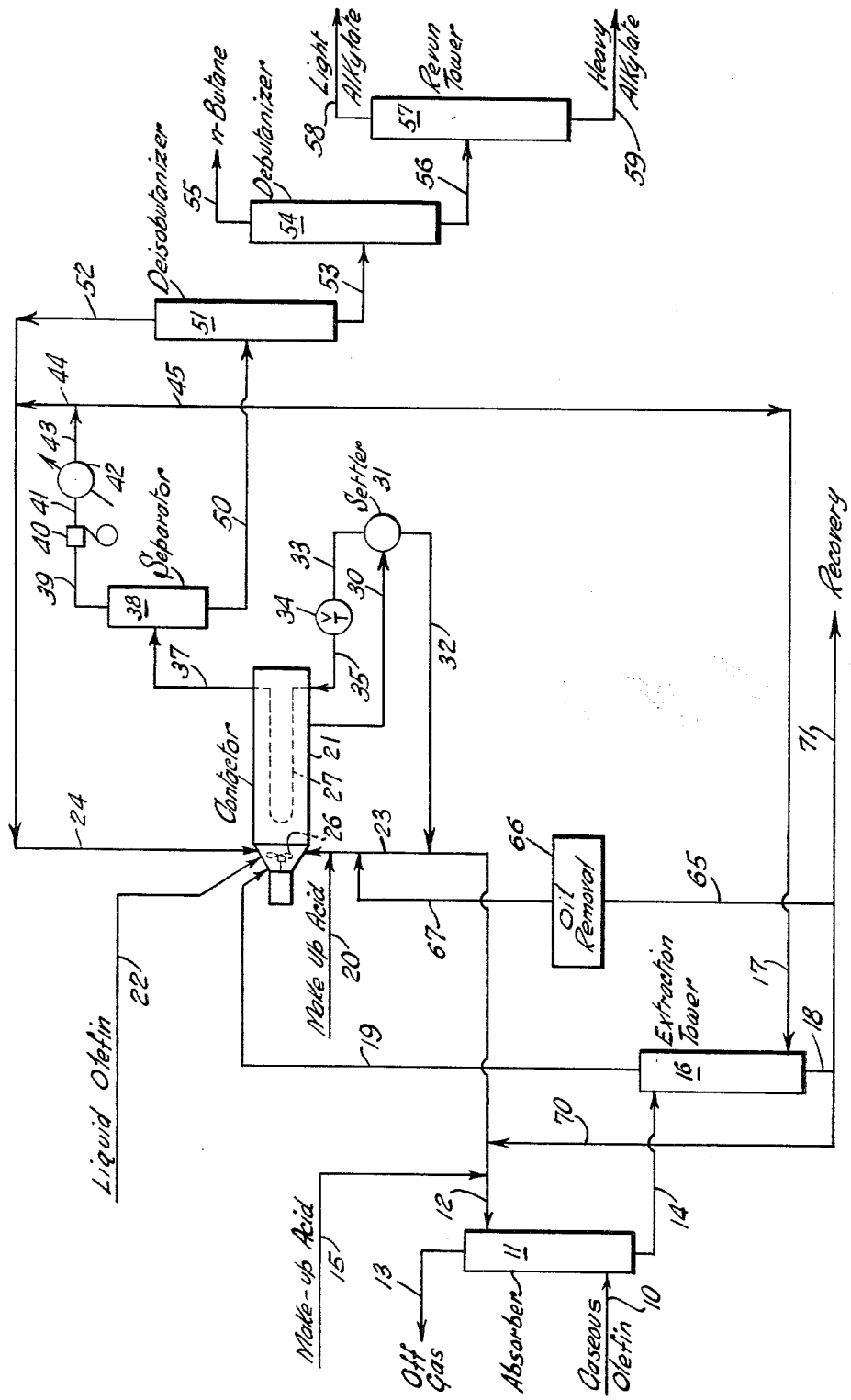

United States Patent Office 3,234,301
Patented Feb. 8, 1966

3,234,301
SULFURIC ACID RECOVERY PROCESS
Arthur R. Goldsby, Chappaqua, N.Y., assignor to Texaco Inc., New York, N.Y., a corporation of Delaware
Filed July 28, 1964, Ser. No. 386,486
5 Claims. (Cl. 260—683.62)

This application is a continuation-in-part of my copending application Serial Number 50,161, filed August 17, 1960, now abandoned.

This invention is directed to improvements in the recovery of sulfuric acid used in chemical reactions. More particularly, it is directed to improvements in the recovery of sulfuric acid catalyst used in the alkylation of olefin-based material with isoparaffins or aromatics. This recovery process comprises the absorption of an olefin in used sulfuric acid, extraction of the alkyl esters, and alkylation of the alkyl esters. In one embodiment of the invention propylene is reacted with used sulfuric acid forming dipropyl sulfate which is reacted with isobutane in the presence of sulfuric acid in an alkylation zone, and sulfuric acid catalyst from this reaction zone is passed to a second alkylation zone in contact with isobutane and butylenes. Liquid reaction mixture from the second alkylation zone is withdrawn, separated into hydrocarbon and catalyst phases, and a part of the catalyst phase is contacted with propylene forming an absorption product comprising dipropyl sulfate. The absorption product is contacted with an isobutane rich hydrocarbon liquid effecting extraction of said dipropyl sulfate forming a raffinate comprising acidic material and an extract mixture comprising a solution of dipropyl sulfate in isobutane. The extract mixture is purified and passed to the first alkylation zone to supply the dipropyl sulfate.

In the catalytic alkylation of olefin-based material with isoparaffins, a preponderance of isoparaffin (generally as much as 60 to 80 volume percent or more of the hydrocarbons in the reaction mixture) is used to direct the reaction towards production of the most valuable aviation or automotive fuels. Consequently a large quantity of isoparaffin must be recovered and recycled for reuse in the process. Isobutane is generally used as the isoparaffin for the manufacture of aviation or motor fuels although other isoparaffins, for example isopentane, may be employed.

In sulfuric acid alkylation, the mol ratio of isoparaffin to olefin-based material supplied to the alkylation zone is maintained substantially in excess of 1 to 1, and preferably within the range of about 4 to about 20 to 1. The catalyst to liquid hydrocarbon volume ratio is maintained within the range of about 0.5 to 1 to about 5 to 1 and preferably within the range of about 1 to 1 to about 3 to 1. Catalyst strength is maintained at least about 88 percent sulfuric acid strength. A liquid catalyst which is nonvolatile under alkylation reaction conditions, for example, sulfuric acid is preferred. Sulfuric acid strength is maintained within the range of about 88 to 95 percent by purging spent acid from the system and by adding make-up acid of about 98.0 to 99.9 percent concentration.

An important part of the isobutane employed in alkylation processing is a recycle stream produced by fractional distillation of alkylation products in a deisobutanizing fractional distillation zone wherein the isobutane is recovered as a distillate fraction of high isobutane concentration, for example, about 85 to 95 liquid volume percent isobutane. The high-boiling alkylate in such distillation zone is recovered in the bottoms fraction. This bottoms fraction may be further fractionated in conventional manner to separate light ends and alkylate fractions for use as fuel blending stocks.

In accordance with the process of this invention olefin-based alkylatable material includes olefins, esters and their mixtures. The esters are produced by reaction of alkylation acid with olefin in a separate absorption step. The ester formed in the absorption step is separated in purified form by extraction with liquid hydrocarbon.

Oefins, for example, propylene, butylenes, or mixtures of olefins, may be reacted with sulfuric acid, including acid of less than alkylation strength, to form esters. In the case of sulfuric acid, dialkyl and monoalkyl esters may be formed. Olefins having at least three carbon atoms in the chain predominantly form branched chain esters, although a small amount of normal esters may be formed. The reaction mixture formed upon contacting a hydrocarbon stream containing mixed olefins with sulfuric acid comprises a complex mixture of mono- and diesters containing straight chain and branched chains. In the case of the diesters, the chains may be of the same or different lengths. Dialkyl esters are much more soluble in hydrocarbons than monoalkyl esters and conversely, the latter are more soluble in acid solution. Propylene and butylenes are prefered olefins for use in this invention.

Used alkylation acid may be contacted with olefin to form alkyl esters for alkylation. The absorption product may be contacted with a hydrocarbon to effect separation of the dialkyl ester from remaining acid and contaminants contained in the acid. Advantageously the hydrocarbon employed for extraction comprises isobutane. The extract comprising ester dissolved in isoparaffin is supplied to the alkylation unit to provide a part of the isoparaffin requirements as well as a part of the olefin-based material. This extraction step effectively recovers a part of the acid from the spent acid discharged from the system, and it is returned to the alkylation system, eliminating the catalyst contaminants froms the alkylation system. Remaining acid and contaminants are discharged to conventional acid recovery facilities. Advantageously the raffinate acid may be processed to effect hydrolysis of any alkyl esters contained therein, for example, acid alkyl esters, thereby forming useful by-product alcohols.

In maintaining catalyst strength in sulfuric acid catalyzed alkylation, it is generally necessary to withdraw acid at a rate of about 0.4 to 1.5 pounds per gallon of alkylate produced. The acid withdrawn may have a composition for example, of 90.0 weight percent $H_2SO_4$, 3.6 weight percent water and 6.4 weight percent acid soluble organic matter. The purpose of withdrawing the spent acid is to reject the water and acid soluble oil and this stream is reprocessed to recover the remaining acid. In accordance with the process of this invention, 50 to 90 percent of the sulfuric acid contained in spent acid is recovered in the form of alkyl sulfates. Upon separation and alkylation of this alkyl sulfate, sulfuric acid of 100 percent strength is liberated in the reaction zone so that the make up acid rate may be reduced to about 10 to 50 percent of that otherwise necessary.

Advantageously, spent sulfuric acid catalyst may be employed to extract alkylatable olefin from hydrocarbon streams in which the olefin is too dilute for inclusion directly in alkylation feed. For example, a hydrocarbon stream containing only about 10 to 30 percent propylene may be contacted with spent sulfuric acid catalyst to effect separation of the olefin as dipropyl sulfate from the remaining saturated hydrocarbons as well as from ethylene which is desirably excluded from alkylation feed to avoid excessive catalyst consumption. Olefins streams containing a higher percentage of propylene, such as those produced by catalytic cracking, are also suitable. Selective separation of propylene from ethylene containing streams is readily effected since the absorption rate of propylene in sulfuric acid is about 300 times that of ethylene for acid concentrations of 80 percent and higher.

Nevertheless under some conditions some ethylene may be absorbed. An advantage of this process is that any ethylene which is absorbed in the absorption step forms compounds such as ethyl acid sulfate, which are relatively insoluble in hydrocarbons such as isobutane. Hence they are not extracted with the propyl sulfates and those of higher molecular weight.

The absorption step may be effected in contacting equipment well known in the art, for example, mixer-settlers, centrifugal contactors, or countercurrent towers. Countercurrent contacting is preferred and is advantageously effected in countercurrent towers with either gaseous or liquid olefin containing hydrocarbon streams, or a combination of gaseous and liquid phase.

In either case propylene containing hydrocarbon is introduced into the bottom of the tower and lean hydrocarbon is discharged from the top. Sulfuric acid introduced into the top of the tower is relatively strong effectively stripping remaining propylene from the exit hydrocarbon. As the acid descends through the column, it is consumed by reaction with propylene so that at the bottom of the tower the acid is relatively weak, and is rich in dipropyl sulfates. The relatively weak acid in contact with the most concentrated olefin tends to favor the formation of dipropyl sulfate by converting the propyl acid sulfate to the diester. However, in some cases, it is advantageous to have the olefin in the top of a countercurrent tower contact acid containing some absorbed olefin, in order to minimize undesirable reactions of the olefins.

The acid fed to the absorption zone may consist of used alkylation acid or may comprise a mixture of alkylation acid with a recycle stream of acid from the absorption or extraction step proportioned to effect efficient olefin absorption.

The absorption temperature is desirably maintained within a range of about 40 to 100° F., or lower. Since a substantial amount of heat is released upon absorption of olefins in acid, it is necessary to cool the absorption step to maintain the temperature within the desired range. Cooling of the absorption step is effected by cooling the feed streams to the absorption tower and/or by cooling the material within the absorption step either by evaporative cooling or by indirect heat exchange methods. Liquid may be withdrawn from the absorption system, cooled by indirect heat exchange, and returned to the absorber. Coolant may be supplied by a separate refrigeration system or may be effected with a process stream. In one embodiment of this process, hydrocarbon effluent from the alkylation reaction zone is flashed effecting vaporization of a part of the hydrocarbon liquid and cooling of the resulting liquid and vapor. The resulting chilled hydrocarbon liquid and vapor are passed in direct heat exchange with a stream in the absorption reaction mixture to effect cooling thereof.

When a normal paraffin such as propane or normal butane is used to extract the alkyl sulfates, the normal paraffin may be flashed from the alkyl sulfates prior to alkylation of the alkyl sulfates. Indirect heat exchange of either the absorber reaction mixture or alkylation reaction mixture with the normal paraffin-alkyl sulfate extract may be employed. When the absorption step is carried out in the liquid phase, some dialkyl sulfate is extracted by the hydrocarbons associated with the olefin feed. After separation of the hydrocarbon and acid phases, the hydrocarbon phase containing dialkyl sulfate may be passed, if desired, directly to an alkylation zone. If the hydrocarbon phase should contain a high percentage of normal paraffin, such as propane or normal butane, all or at least part of the normal paraffin may be removed, if desired, before passing the hydrocarbon phase to the alkylation zone.

The extraction step may be effected in contacting equipment known in the art, for example, mixer-settlers, centrifugal contactors or countercurrent towers, for example, a Rotating Disc Contactor. Extraction of diester from the remaining relatively weak acid is readily effected with the hydrocarbon liquid, preferably, an isoparaffin, for example isobutane. In a countercurrent tower the acid-diester solution from the absorption step is introduced near the top and is discharged from the tower bottom as raffinate containing weak acidic material and acid soluble oil. The solvent isobutane is introduced at the bottom and extract mixture comprising dipropyl sulfate in isobutane is removed at the top.

Selectivity of the hydrocarbon solvent for the separation of esters from the oily polymeric substances which act as catalyst poisons in the sulfuric acid increases with decreasing temperature, and extraction temperature below 100° F. are preferred. However, the solubility of the ester also decreases with decreasing temperature so that the temperature of the mixture in the extraction zone is preferably maintained above about 40° F. to achieve practical solvent rates. When the temperature of the rich acid from the absorption zone is substantially above 40° F., the extraction zone temperature may be maintained at a desired level by using a solvent at a temperature below 40° F., for example about 0 to 20° F. The refrigerant recycle isobutane stream in commercial sulfuric acid alkylation unit is suitable for this purpose. Chilling of the solvent may be effected by flashing, that is, by the substantially adiabatic expansion of the solvent liquid to a lower pressure thereby vaporizing a part of the liquid and concomitantly cooling the resultant vapor-liquid mixture. When operating the absorber at temperatures below 40° F., a relatively warm solvent stream such as the cooled deisobutanizer overhead at 75 to 100° F., may be employed to establish and maintain a desired temperature level in the extraction zone.

The concentration of free acid in the mixture which is contacted with solvent in the extraction zone, calculated on the basis that all of the olefin reacts to form dialkyl sulfate, is maintained within the range of about 50 to 90 percent and preferably within the range of about 70 to 90 percent. Lower acidity favors extraction of the dialkyl esters but the acidity must be maintained high enough to prevent extraction of the oily polymeric material. When employing strong makeup acid, for example 99.7 percent concentration and the recycle alkylation acid of a correspondingly low water content, the free acid concentration in the extraction step may be adjusted by the addition of water or weak acid, for example raffinate acid, before or after water dilution, to maintain the concentration of the free acid within the desired range.

In some applications it may be desirable to extract the alkyl sulfates from the rich absorption mixture by contact with a hydrocarbon which is preferably excluded from the feed to the alkylation zone for example propane, normal butane and other normal paraffins, or hydrocarbon liquids, such as alkylate. It is preferred to separate at least a part of such material from the alkyl ester before passing to the alkylation zone to avoid dilution of the reactants in the reaction zone. After extraction, the solvent, in the case of normal butane or propane, may be readily separated from the alkyl sulfate by simple flashing. When normal paraffin is flashed from the alkyl sulfate, the resulting chilled vapor and liquid or either may be employed to cool the absorption step or the alkylation step using conventional indirect heat exchange equipment.

It is not essential that the solvent, such as propane or alkylate, be removed prior to charging the alkyl sulfates to the alkylation reaction, since it would usually be a relatively small amount compared to the total hydrocarbons in the alkylation system. Also, in the case of propane it is easily removed in the alkylation system by a depropanizer. In the case of a lean propylene stream, for example one containing only about 10 percent of propylene and about 90 percent propane, sufficient propane would be available for the extraction step after the absorption of the propylene.

Liquid propane or liquid normal butane from the depropanizer and debutanizer, respectively, in an alkylation unit are suitable as solvent for the extraction step.

Rich solvent from the extraction step may be chilled effecting separation of diester. This method of separation may be particularly useful wherein propane, normal butane or other normal paraffin is employed as extraction solvent and it is desired to separate the extracted ester from at least part of the solvent before passing it to the alkylation zone. For example the extract mixture may be cooled to a temperature below about 40° F. whereupon the dialkyl ester may be separated as a separate liquid or solid phase. By cooling the extract mix to a temperature below the melting point of the ester, for example below minus 2.2° F. for diisopropyl sulfate, the ester may be separated from the solvent liquid by any suitable phase separation technique, for example filtration, settling, centrifugal separation or the like.

This cooling method of separation of alkyl sulfates may be advantageously used not only when a normal paraffin is used for the extraction, but also when the preferred solvent, isobutane, is used if the absorption and extraction steps are carried out so that an appreciable portion of the contaminant oil in the spent alkylation acid charged to the absorber appears in the extract, since it has been found that the alkyl sulfates separated by cooling contain a much lower percentage of the contaminant than originally in the extract.

The isobutane-dipropyl sulfate extract mixture is passed to a sulfuric acid alkylation zone wherein the dipropyl sulfate, in admixture with butylenes and isobutane, is contacted with a sulfuric acid alkylation catalyst. The butylenes separately react with isobutane to produce alkylate but also act to promote alkylation of the dipropyl sulfate with isobutane. The dipropyl sulfates and isobutane react forming alkylate and release sulfuric acid. Advantageously, the extract mixture is passed to the alkylation zone at a rate such that the released sulfuric acid maintains the acidity of the catalyst above about 88 percent without the addition of fresh make-up acid.

The absorption-extraction steps when processing propylene effect separation of the ester predominantly as dipropyl sulfate, and suppress formation and separation of the propyl acid ester so that preferentially dipropyl ester is passed to the alkylation zone.

Raffinate acid from the extractor comprises water, remaining unreacted sulfuric acid, water soluble esters, for example, acid alkyl sulfates, oily polymeric substances, and other contaminants from the alkylation reaction system. Upon further dilution with water, the oily polymeric materials separate from the raffinate acid as an oil layer. These oily polymeric materials, which act as alkylation catalyst poison, may be readily separated from the dilute acid solution. This dilute acid may be returned to the absorber to assist in control of acidity therein. The dipropyl ester is also insoluble in dilute acid solutions so any remaining dipropyl sulfate may also be separated from the raffinate acid by dilution with water. By this means it is possible to partition the water insoluble portion of the raffinate by adding water in increments, first separating dipropyl sulfate and thereafter separating the oily polymeric materials upon the addition of more water. Separation may also be facilitated by the addition of "salting out" agents, for example, sodium sulfate and sodium chloride.

An advantage of the process of this invention is that propylene and butylene feed streams may be charged to an absorption and an alkylation step, respectively, such that the spent acid from the butylene alkylation is recovered and reinstroduced into the alkylation zone in the form of dipropyl sulfate.

Having set forth its general nature, the invention will be best understood from the more detailed description hereinafter which refers to the accompanying drawing. Although the drawing illustrates one arrangement of apparatus in which the process of this invention may be practiced it is not intended to limit the invention to the particular apparatus or materials described. It may readily be applied to commercial alkylation processes, such as effluent refrigeration and cascade autorefrigeration.

A gaseous olefin containing stream comprising propylene with lesser amounts of ethylene and butylenes in admixture with saturated hydrocarbons is passed through line 10 to absorber 11. Gas rising in absorber 11 is contacted countercurrently with descending sulfuric acid introduced into absorber 11 at the top through line 12. The sulfuric acid absorbs propylene and butylenes forming the corresponding esters, and the remaining gases containing ethylene and saturated hydrocarbons are discharged from the top of absorber 11 through line 13. Rich acid containing absorbed olefins is withdrawn from the bottom of absorber 11 through line 14 and discharged to extraction tower 16.

In extraction tower 16, the rich acid is contacted in countercurrent flow with liquid isobutane introduced through line 17. Weak acid containing contaminants, diluent water, and a small amount of acid ester is withdrawn as raffinate from the bottom of tower 16 through line 18. Extract comprising a solution of dipropyl sulfate in isobutane is withdrawn from the top of tower 16 through line 19 and passed to alkylation contactor 21.

A liquid olefin stream comprising butylene is passed through line 22, acid is passed through line 23, and recycle isobutane is passed through line 24 to contactor 21. An intimately dispersed emulsion of hydrocarbon and acid is formed and maintained by rapidly circulating the mixture of olefin, ester, isobutane, and acid catalyst by means of impeller 26. The ester and olefin react exothermally with isobutane, and the reaction mixture is cooled by indirect heat exchange with coolant in coil 27. A part of the reaction mixture is withdrawn from contactor 21 through line 30 and discharged to settler 31, wherein the emulsion is separated into hydrocarbon and acid phases. Acid is withdrawn from the bottom of settler 31 through line 32 to supply acid to the contactor through line 23 and to the absorber through line 12. Make-up acid as necessary is added through line 15 into line 12 or through line 20 into line 23 or both. Liquid hydrocarbon, separated in the top of settler 31, is withdrawn through line 33 and passed through throttle valve 34 wherein the liquid hydrocarbon is adiabatically expanded effecting partial vaporization and chilling of the resultant liquid and vapor mixture. The chilled mixture is passed through line 35 and cooling coil 27 to maintain the desired temperature of the reaction mixture in the contactor. Effluent from cooling coil 27 is discharged through line 37 to separator 38 wherein vapor is separated from remaining liquid. Vapor from separator 38, comprising isobutane with relatively small amount of other saturated hydrocarbons, is withdrawn through line 39. This vapor is compressed in compressor 40 and passed through line 41 to cooler 42. The compressed gases are condensed in cooler 42 forming isobutane rich condensate which is discharged through lines 44 and 24 to contactor 21 and through lines 45 and 17 to supply isobutane to extraction tower 16.

Liquid from separator 38, comprising isobutane, a small amount of normal butane, and alkylate, is withdrawn from the bottom of separator 38 through line 50 and passed to deisobutanizer 51. Deisobutanizer 51 comprises a fractional distillation column effecting separation of isobutane from heavier hydrocarbons. Isobutane is withdrawn through line 52 and passed through line 24 to the alkylation contactor. Isobutane, by means of suitable manifolding not shown, may be passed from line 52 to supply isobutane to extraction tower 16. Deisobutanizer liquid is withdrawn from the bottom of deisobutanizer 51 through line 53 and passed to debutanizer 54. Debutanizer 54 is a fractional distillation tower effecting separation of normal butane from remaining alkylate. Normal butane is discharged through line 55 and debutanized total alkylate is withdrawn through line 56. The total alkylate withdrawn through line 56 may be employed directly in the manufacture of motor fuel or may be fractionated in rerun tower 57 to separate light alkylate withdrawn through line 58 suitable for aviation gasoline manufacture and heavy alkylate discharged through line 59.

Obviously the alkylation reactor may be effected in a single contacting zone as shown or may be effected in a multiple reactor system with the reactors run in series or parallel flow. When employing multiple reactor systems, the extract mixture of isobutane and dipropyl sulfate may be distributed among the various reactors to maintain proper acidity in each reactor since the diester stream in effect introduces 100 percent acid into each alkylation zone. In this way the system acidity of all the alkylation reactors in a multiple reactor system may be maintained at high level, if desired.

Although isobutane as condensate in line 43 or isobutane from the deisobutanizer in line 52 may be employed in the extraction tower, the condensate stream is preferred since it may be condensed at a relatively low temperature or may be cooled by simple flashing to a temperature of the order of 20° F. This cold isobutane is preferred in effecting the extraction in tower 16. Since greater selectivity in the extraction is achieved at low temperature and additionally, the extract mixture from the top of the tower is passed to the alkylation zone at low temperature thus reducing the refrigeration load required in cooling the alkylation zone. Alternatively, isobutane from the deisobutanizer overhead may be employed in a preliminary extraction zone and cold isobutane condensate may be employed in a final stage thereby achieving efficient utilization of the isobutane with maximum cooling selectivity in extraction.

In the combination absorption-alkylation system described, the introduction of dipropyl sulfate tends to raise the acidity of the acid in the alkylation zone. In some circumstances it may be desirable to control the system acidity at an optimum concentration below 100 percent. This may be effected by passing a part of the raffinate acid from line 18 through line 65, oil removal facility 66 and line 67 to line 23. Acid soluble oil may be removed from the raffinate acid in facility 66 by water dilution which causes the oil to separate or by other separating means, for example sorption or salting out. Similarly the acidity in the absorption step may be adjusted by recycle of a part of the raffinate acid from line 18 through line 70, or by line 65 through line 70. Raffinate acid may be discharged from the system through line 71 for recovery of the acid and unextracted esters.

Although the sulfuric acid alkylation catalyst is usually spoken of as if it were of a definite composition, actually its composition changes over fairly wide limits under different conditions of alkylation, for example, in a multiple reactor unit with series acid flow of the acid. In such an operation the titratable acidity of the catalyst may vary from about 97 percent down to 88 percent even though fresh make-up acid of about 99.7 percent concentration is used. In addition to the titratable acidity the organic content of the acid and the water content also vary. The process of this invention enables the optimum catalyst composition for a particular application to be achieved and maintained by the suitable addition of the desired amount of dialkyl esters and raffinate acid to the alkylation reactors.

A preferred method for obtaining a high recovery of the acid is to use a countercurrent system or two absorbers and two extractors with the raffinate acid from the first extractor being used as charge acid to the second absorber. In the first absorber the concentration of the make-up acid to the absorber and the amount of olefin absorbed may be controlled so that the organic contaminant which is harmful to the alkylation reaction is not extracted in the extraction step. With a countercurrent absorber, if the maximum amount of olefin is absorbed, only one extractor would be required.

As much of the olefin as possible may be absorbed in the second absorption step and the alkyl sulfates extracted. In this case, the concentration of the free acidity may become so low that appreciable oil is extracted along with the alkyl sulfates. In such a case, at least part of the oil is advantageously removed before charging the alkyl sulfates to the alkylation system. Alternatively, the absorption mixture from the second absorber may be diluted with water or weak raffinate acid from another source to spring the dialkyl sulfates. After the removal of the oil and water from the alkyl sulfates, the alkyl sulfates may be charged to the alkylation system along with alkyl sulfates from the first extractor and/or along with additional olefins.

A preferred method of purifying the dialkyl sulfates or for removing polymeric oil from hydrocarbon extract of dialkyl sulfates is by treatment with strong sulfuric acid, such as the make-up alkylation catalyst or used alkylation catalyst of about 88 to 90 percent concentration. It has been discovered that the polymeric oil reacts with strong sulfuric acid to give a reaction product which is insoluble in hydrocarbons and soluble in excess acid. If the stoichiometric amount of acid, which is approximately an equal weight of acid basis the oil content of the extract, is mixed with the extract, essentially quantitative removal of the oil is obtained. The acid-oil reaction product may be separated by gravity settling. To insure substantially complete removal of the oil and also any water present, an excess of said may be used. If too great an excess of acid is used, some dialkyl sulfate will dissolve in it and be lost from the extract. This is not too serious as the dialkyl sulfate may be reextracted with a hydrocarbon solvent from the separated acid phase. Or when operating in a continuous system, the acid phase may be charged to the main extraction tower, preferably not far above the hydrocarbon solvent entry point. Uncontrolled degradation of the dialkyl sulfate is prevented by the use of low temperature, for example, not above about 60° F., the use of short contact times, for example, less than about five minutes, and by the use of acid in an amount equal to or less than the weight of the polymeric oil. Under some conditions, it has been found possible and advantageous to conduct the acid treatment on the entire absorption reaction mixture containing dialkyl sulfates rather than on the hydrocarbon extract. In this case more acid is required since more of the polymeric oil is present, and in addition considerably more water is present.

The unextracted esters which are largely alkyl acid sulfates may be converted to alcohols by hydrolysis. Sufficient water or weak acid is added to give a titratable acidity of about 40 percent or lower. The dilute acid mixture is then distilled to recover the alcohols.

It has been discovered that a further reduction in acid consumption may be obtained, and a reduced residence time may be used for the alkylation reaction, if a modification of the process described herein is used. Whereas in the process described, a residence time of twenty minutes or longer may be required to obtain the results shown, a time of five minutes or less may be used to obtain the same or better results. Also, in some cases the alkylation operation is easier to control, for example, when using a relatively high percentage of propylene or propyl esters in relation to butylenes. In such a case, it is usually found necessary to discharge used acid at about 91.0 or 92.0 percent concentration to avoid a periodic run-away condition. The result is a higher acid consumption than if a lower strength used acid were discharged, for example 88 percent.

It has been found that when propyl sulfates are alkylated with isobutane, either alone or simultaneously in the same reactor with the alkylation of propylene or butylenes with isobutane, the discharge acid contains unreacted propyl sulfates to an appreciable extent, for example up to 5 percent or higher by weight of the acid phase. It has been discovered that if instead of charging the discharge acid containing unreacted alkyl sulfates to the absorber, it is first charged to a second or separate alkylation reactor in which butylenes are being reacted with isobutane, the propyl sulfates are almost entirely alkylated with a resulting concentration of propyl sulaftes or less than 1.0 percent of the acid phase. In a series emulsion flow unit, such as one with a cascade flow with several reaction zones in series, the same effect may be accomplished by passing the reaction mixture or emulsion containing unreacted propyl sulfates to a succeeding reaction zone in which butylenes are being alkylated with isobutane.

The discharge acid from the separate alkylation zone containing a greatly reduced amount of unreacted propyl sulfates is charged to the absorber, and processed as previously described.

The acidity of the acid in the two reactors will vary depending on a number of factors. However, the acidity in the reactor to which the isobutane extract of propyl sulfates is charged should always be higher, for example about 91.0 to 93.0 percent, whereas in the other reactor it may be as low as about 88.0 percent. Some of the discharge acid is also recycled to the separate alkylation zone. If desired, some of the discharge acid may also be recycled to the first alkylation zone or the one in which the major portion of the propyl sulfates is alkylated.

*Example I*

A charge stock with the following composition is charged near the bottom of a countercurrent absorber at a rate of 1330 barrels per day:

| | Liq. vol. percent |
|---|---|
| Ethylene | 0.5 |
| Ethane | 1.0 |
| Propylene | 51.0 |
| Propane | 43.9 |
| Isobutane | 1.9 |
| Butylenes | 1.3 |
| n-Butane | 0.4 |
| | 100.0 |

The absorber is held about 50 p.s.i.g. and a temperature of 50° F. Used alkylation acid at a rate of 182,966 pounds per day with a titratable acidity of 90.4 percent and containing 3.0 percent water is charged near the top of the tower. Substantially all of the ethylene and propane is discharged from the top of the tower as a vapor. 90 percent of the propylene is obsorbed in the acid, mainly as diisopropyl sulfate.

The fat acid from the bottom of the absorption tower is extracted in liquid phase in a countercurrent tower with 3 volumes of isobutane at a temperature of 50 to 55° F. A mixture of cooled isobutane from the deisobutanizer overhead and flashed condensate liquid from the compressor is charged near the bottom of the tower. Alkyl sulfates representing 78.7 percent of the sulfuric acid charged to the absorber are extracted by the isobutane or 71.1 percent by weight of the total used acid charged to the absorber.

The raffinate amounting to 34.6 percent of the used acid charged to the absorber and containing substantially all of the water and oil has a composition of 8.7 percent water, 10.7 percent oil, 28.9 percent propyl acid sulfate, 41.0 percent diisopropyl sulfate, and 10.7 percent sulfuric acid.

The extract comprising isobutane, diisopropyl sulfate and a small amount of propyl acid sulfate is charged to an alkylation unit along with 5,167 barrels per day of a feed stock with the following composition:

| | Liq. vol. percent |
|---|---|
| Ethylene | 0.1 |
| Ethane | 0.5 |
| Propylene | 6.0 |
| Propane | 4.0 |
| Isobutane | 24.0 |
| Butylenes | 51.0 |
| n-Butane | 14.4 |
| | 100.0 |

Fresh sulfuric acid of 99.6 percent concentration is charged to the alkylation unit in the amount of 33,588 pounds per day to maintain the acidity of the acid discharged from the alkylation unit and charged to the absorber at 90.4 percent. This represents a net acid consumption of 0.13 pounds per gallon of alkylate. No fresh sulfuric acid is charged to the absorber.

The production of total debutanized alkylate is 6,127 barrels per day. The alkylate has a 90 percent point of 245° F. and an end point of 360° F. The clear CFRR octane number is 94.0 and is 104.0 with 3.0 cc. of TEL.

When the same feed stocks are alkylated in conventional manner and not as an acid recovery process it is estimated that the acid consumption is approximately 150,000 pounds per day compared with 33,588 pounds in this example or 0.58 pound per gallon of alkylate compared with 0.13 pound per gallon of alkylate respectively.

*Example II*

A liquid propylene stream at a rate of 370 barrels per day and containing 49.5 volume percent propylene is contacted at 30° F. with 52,940 pounds per day of used sulfuric acid alkylation catalyst in an aborber. The used alkylation catalyst has a titratable acidity of 88.7 weight percent, and contains 2.9 weight percent water and 5.8 weight percent conjunct acid soluble polymer and other catalyst contaminants. The resulting reaction mixture, having a titratable acidity of 5.3 weight percent, comprising 78,483 pounds of dipropyl sulfate, 3,176 pounds of polymeric contaminants and 1,588 pounds of water, and acidic material, is withdrawn from the absorber and passed to an extractor where it is countercurrently contacted at 45° F. with 470 barrels per day of condensate containing 1.0 volume percent propane and lighter, 89.0 volume isobutane and 10.0 volume percent normal butane and heavier. Dipropyl sulfates and some of the catalyst contaminants are extracted forming an extraction mixture comprising 74,560 pounds of dipropyl sulfate and 1.560 pounds of polymeric contaminants in isobutane rich condensate substantially free of water. The extraction mixture is withdrawn from the extractor and contacted with 1,872 pounds per day of used alkylation acid of 88.7 percent concentration, separating a sludge and reducing the contaminant content of the extraction mixture substantially to zero weight percent.

The acid treated extraction mixture comprising dipropyl sulfate and 813 barrels per day of butane-butylenes containing 57.0 volume percent of butylenes for a period of 5.1 minutes are contacted with isobutane and alkylation acid of 92.5–93.5 percent titratable acidity as an emulsion at a temperature of 50° F. in a primary alkylation zone. Emulsified reaction mixture is withdrawn from the primary reactor and passed to a settler where a hydrocarbon phase comprising unreacted isobutane and alkylate formed by the reaction of dipropyl sulfate and butylenes with isobutane is separated from the alkylation catalyst. Acid catalyst containing 3.9 weight percent unreacted propyl sulfates is withdrawn from the primary product settler and passed to a secondary alkylation zone together with 1,135 barrels per day of butylene feed stock containing 57.0 volume percent butylenes and isobutane distilliate. Alkylation of the butylenes and unreacted propyl sulfates with isobutane is effected in an emulsion at a temperature of 40° F. and a residence time of 4.6 minutes. Reaction mixture withdrawn from the secondary alkylation zone is passed to a secondary product separator where hydrocarbon phase comprising unreacted isobutane and alkylate are separated from acid phase comprising the alkylation catalyst substantially free of unreacted propyl sulfates.

The hydrocarbon phases from the primary and secondary alkylation zones are used to control the temperatures and absorb the exothermic heat of alkylation in the respective zones by the process of effluent refrigeration. Vapor resulting from the cooling, which is predominantly isobutane, is combined and condensed, depropanized and flashed, forming the isbutane condensate stream passed to the dipropyl sulfate extractor. The remaining liquid product from the primary alkylation zone, after cooling, is distilled separating isobutane distillate and 1,050 barrels per day of propylene-butylene alkylate. Similarly, isobutane distillate and 1,100 barrels per day of butylene alkylate are separated from the liquid remaining after cooling the secondary alkylation zone product. Alternatively, the two liquid product streams may be combined to separate a single liquid product alkylate if desired.

Although most of the fresh make-up acid is furnished by the recovery system in the form of diisopropyl sulfate, which is equivalent to 53.0 percent by weight of 100 percent sulfuric acid, charged to the primary reactor, 8,555 pounds per day of 99.0 percent sulfuric acid are charged to the secondary reactor. This represents the net acid consumption and amounts to 0.09 pound of acid per gallon of alkylate. The overall alkylate from the primary and secondary reactors has a 90 percent point of 240° F. and an end point of 365° F. The clear CFRR octane number is 94.5 and is 106.9 with 3.0 cc. of TEL.

When the same feed stocks are alkylated using only a primary reactor for alyklation of the dipropyl sulfate and butylenes, a residence time of about 23 minutes and a discharge acidity of 91.0–92.0 percent are required. Even with these conditions, the net acid consumption is 0.14 pound of acid per gallon of alkylate.

I claim:
1. A process for the recovery of used sulfuric acid alkylation catalyst containing acid soluble oil contaminants and water which comprises
   contacting said used sulfuric acid with propylene forming a reaction mixture comprising dipropyl sulfate, acid soluble oil contaminants and water,
   contacting said reaction mixture with isobutane condensate as hereinafter provided forming an extract comprising dipropyl sulfate and isobutane, and a raffinate comprising at least a portion of said acid soluble oil contaminants and water,
   contacting said extract with sulfuric acid alkylation catalyst under alkylation conditions in an alkylation zone cooled by the evaporation of at least a part of the reaction mixture of said alkylation zone, forming an isobutane rich vapor, remaining hydrocarbon liquid comprising unvaporized isobutane and alkylate product, and catalyst,
   condensing said isobutane rich vapor forming said isobutane rich condensate,
   and separating alkylate product from said remaining hydrocarbon liquid.
2. A process for the recovery of used sulfuric acid alkylation catalyst containing acid soluble oil contaminants and water which comprises
   contacting said used sulfuric acid with propylene forming a reaction mixture comprising dipropyl sulfate, acid soluble oil contaminants and water,
   contacting said reaction mixture with isobutane condensate as hereinafter provided forming an extract comprising dipropyl sulfate and isobutane, and a raffinate comprising at least a portion of said acid soluble oil contaminants and water,
   contacting said extract with sulfuric acid effecting formation of a sludge thereby removing acid soluble oil contaminants,
   separating said sludge from purified extract, contacting said purified extract with sulfuric acid alkylation catalyst under alkylation conditions in an alkylation zone cooled by the evaporation of at least a part of the reaction mixture of said alkylation zone forming an isobutane rich vapor, remaining hydrocarbon liquid comprising unvaporized isobutane and alkylate product, and catalyst,
   condensing said isobutane rich vapor forming said isobutane rich condensate,
   and separating alkylate product from said remaining hydrocarbon liquid.
3. A process for the recovery of used sulfuric acid alkylation catalyst containing acid soluble oil contaminants and water which comprises
   contacting said used sulfuric acid with propylene forming a reaction mixture comprising dipropyl sulfate, acid soluble oil contaminants and water,
   contacting said reaction mixture with isobutane condensate as hereinafter provided forming an extract comprising dipropyl sulfate and isobutane and a raffinate comprising at least a portion of said acid soluble oil contaminants and water,
   contacting said extract with sulfuric acid alkylation catalyst under alkylation conditions in a first alkylation zone cooled by the evaporation of at least a part of the reaction mixture forming an isobutane rich vapor, remaining hydrocarbon liquid comprising unvaporized isobutane and alkylate product, and catalyst,
   condensing said isobutane rich vapor forming said isobutane rich condensate,
   and separating alkylate product from said remaining hydrocarbon liquid,
   withdrawing catalyst phase containing unreacted dipropyl sulfate from said first alkylation zone,
   passing said catalyst phase containing unreacted dipropyl sulfate to a second alkylation zone in contact with butylenes and isobutane,
   withdrawing reaction mixture from said second alkylation zone
   and separating said withdrawn reaction mixture into hydrocarbon and used sulfuric acid catalyst phases.
4. The process of claim 3 wherein isobutane is separated as distillate from said remaining hydrocarbon liquid from said first alkylation zone and from said hydrocarbon phase from said second alkylation zone and said distillate is passed to said second alkylation zone to supply isobutane thereto.
5. A process for the recovery of used sulfuric acid alkylation acid containing acid soluble oil contaminants and water, which comprises reacting propylene with used alkylation acid to form an absorption product containing dipropyl sulfates, contacting said absorption mixture with isobutane effecting extraction of said dipropyl sulfates forming a raffinate and an extract comprising dipropyl sulfates and isobutane, passing said extract to an alkylation zone in which a major portion of said dipropyl sulfates is alkylated with said isobutane in the liquid phase in the presence of a sulfuric acid alkylation catalyst, the improvement which comprises withdrawing from said alkylation zone reaction product and acid catalyst containing unreacted propyl sulfates, passing at least a por- tion of said catalyst containing unreacted propyl sulfates to a separate alkylation zone in which butylenes and substantially all of said unreacted propyl sulfates are alkylated with isobutane in the liquid phase in the presence of a sulfuric acid alkylation catalyst, withdrawing at least a part of the reaction mixture from said separate alkylation zone, and separating said withdrawn reaction mixture into hydrocarbon and used sulfric acid catalyst phases.

References Cited by the Examiner

UNITED STATES PATENTS 2,381,041  8/1945  De Long _____ 260—683.61
3,000,994  9/1961  Watson _____ 260—683.61

DELBERT E. GANTZ, *Primary Examiner.*

R. H. SHUBERT, *Assistant Examiner.*